United States Patent
Hahn et al.

[11] 3,714,438
[45] Jan. 30, 1973

[54] METHOD AND APPARATUS FOR PROPAGATING TRAVELING WAVE ENERGY THROUGH RESONANT MATTER

[75] Inventors: Erwin L. Hahn, Berkeley; Samuel L. McCall, Albany, both of Calif.

[73] Assignee: The Regents of the University of California

[22] Filed: July 20, 1970

[21] Appl. No.: 64,022

Related U.S. Application Data

[63] Continuation of Ser. No. 635,193, May 1, 1967, abandoned.

[52] U.S. Cl. .............. 250/199, 331/94.5, 307/311, 350/266, 324/81, 324/96
[51] Int. Cl. .............................................. H04b 9/00
[58] Field of Search .............. 250/199; 330/4.3, 4.5; 331/94.5; 307/80.3, 311, 268; 350/266; 324/81, 96, 97; 333/20, 29

[56] References Cited

UNITED STATES PATENTS

| | | |
|---|---|---|
| 2,623,165 | 12/1952 | Mueller et al. ..................... 250/199 |
| 2,921,184 | 1/1960 | Fruengel ............................. 250/199 |
| 3,200,354 | 8/1965 | White .................................. 330/5.5 |
| 3,293,438 | 12/1966 | Davis, Jr. ............................ 250/199 |

*Primary Examiner*—Albert J. Mayer
*Attorney*—Flehr, Hohbach, Test, Albritton and Herbert

[57] ABSTRACT

Coherent light or other coherent traveling wave energy is passed through a resonant medium containing matter normally resonant to the energy and opaque. The light pulse energy satisfies an area condition, $\pi + \Delta$, and a duration condition less than the relaxation time of the matter of which the resonant medium is composed. In passing through the matter, the pulse is reshaped and delayed. Embodiments of the invention include pulse shapers, delay lines, storage elements and logic elements. The frequency characteristics of the input pulse are also changed leading to embodiments of the invention useful as filters and frequency modulators. These properties result from the details of the resonance bands of the matter of which the medium is composed and, accordingly, lead to an extension of the invention useful in the identification of materials and the analysis and measurement of their properties and structure.

28 Claims, 23 Drawing Figures

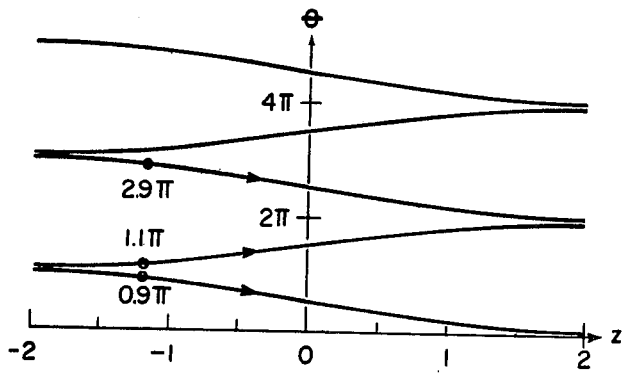
Fig. 1
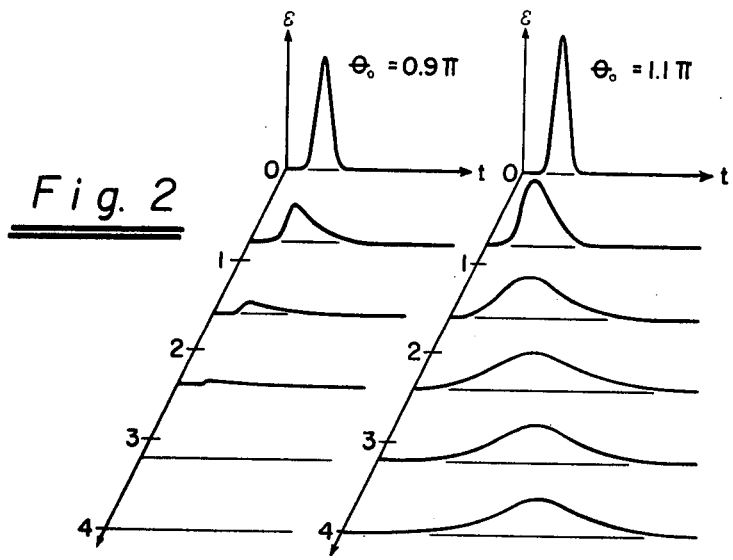
Fig. 2
Fig. 3A
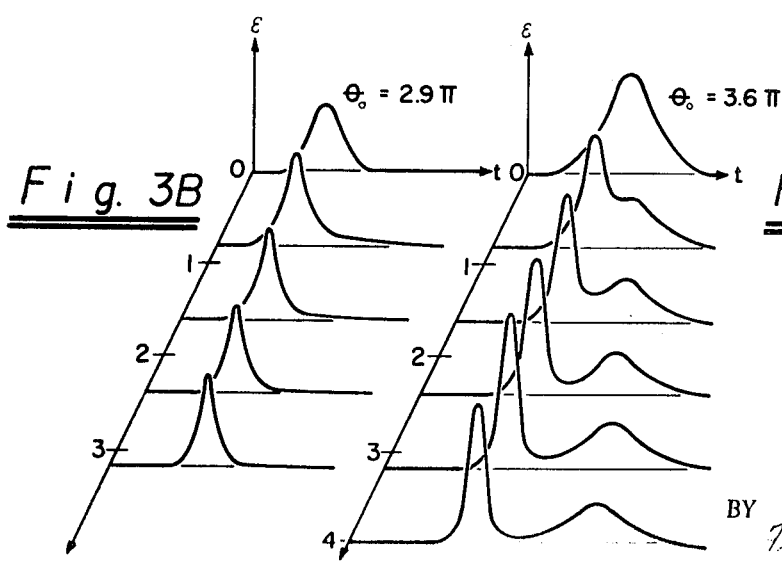
Fig. 3B
Fig. 3C

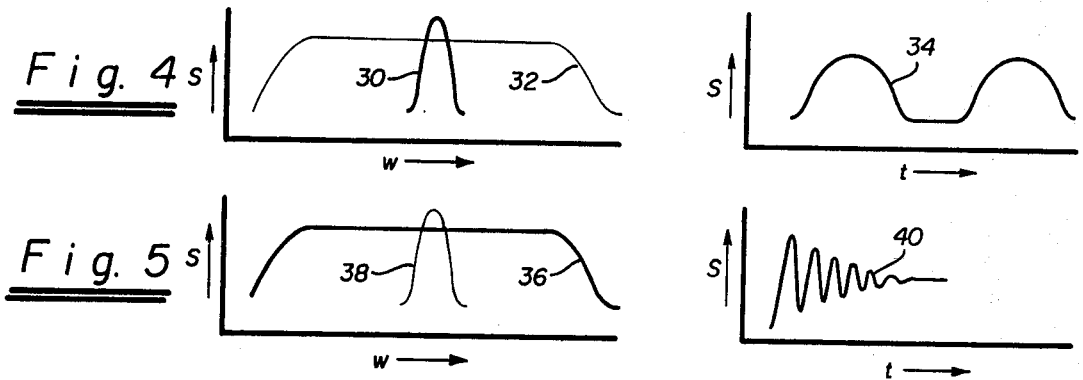
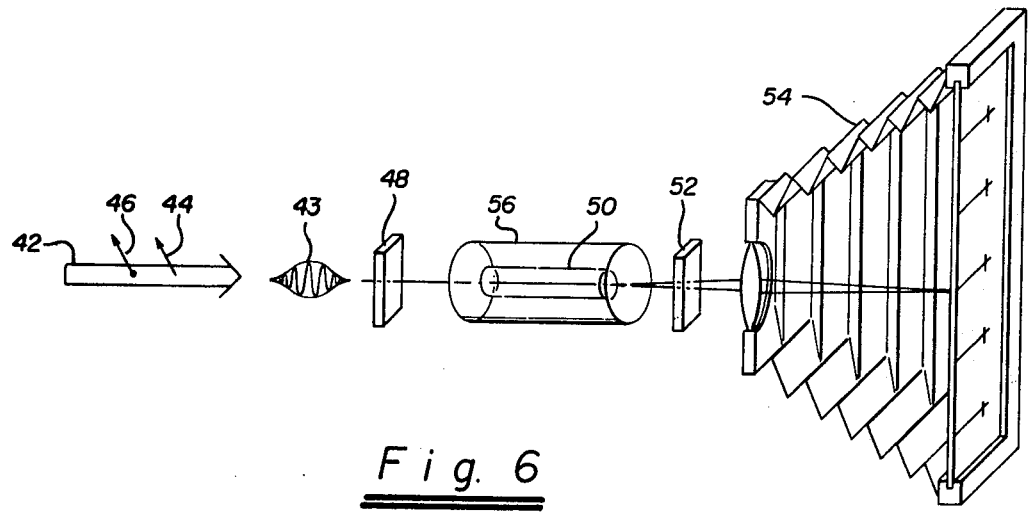
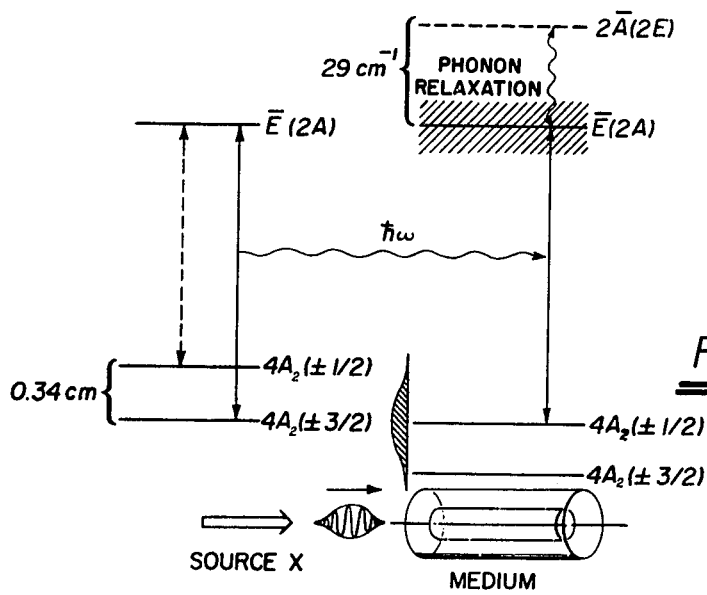

INVENTOR.
Erwin L. Hahn
Samuel L. McCall
BY Flehr, Hohbach, Test
Albritton & Herbert
Attorneys INVENTOR.
Erwin L. Hahn
Samuel L. McCall
BY Flehr Hohbach Test
Albritton & Herbert
Attorneys

METHOD AND APPARATUS FOR PROPAGATING TRAVELING WAVE ENERGY THROUGH RESONANT MATTER

This application is a continuation of application Ser. No. 635,193, filed May 1, 1967, now abandoned.

The invention described herein was made in the course of or under a grant from the National Science Foundation, an agency of the U.S. Government.

BACKGROUND AND SUMMARY OF THE INVENTION

This invention relates to the passage of traveling wave energy through matter which is resonant thereto. More particularly, the invention relates to the passage of electromagnetic energy, such as light, through such resonant matter.

Heretofore, matter resonant to a particular form and frequency of traveling wave energy, such as light, absorbs such energy and is accordingly considered opaque. In general, it is an object of the present invention to provide a method for propagating traveling wave energy, such as light, through such matter.

This invention is predicated on the discovery that a coherent traveling wave pulse satisfying certain criteria as to pulse strength and duration will pass through matter which would normally absorb it. For example, a laser pulse satisfying such criteria has been propagated through a normally opaque, homogeneous crystal of ruby.

As the pulse propagates through the medium it is changed in intensity, shape, polarization, frequency characteristics, direction of propagation, phase, and convergence or divergence. Also, the pulse is delayed and its frequency make-up can be changed. Some input pulses are broken down into a sequence of smaller output pulses spaced in time, the number of which depends upon the strength and duration of the input pulse. The above effects depend upon the nature of the matter of which the medium is constructed and serve to provide information concerning its structure.

In the discussion herein the expression — pulse — will be used in connection with identifying the input signal, the output signal and the detected output pulse, i.e., the envelope of the output signal. With respect to the input signal the output signal, pulse will refer to a burst of periodically varying traveling wave energy. It is believed that the aforementioned usage will not cause confusion since the context will make the particular meaning clear.

Among the other objects of the invention are the following: to transmit coherent pulses of electromagnetic radiation through media, at or near resonance, where the media is ordinarily opaque to incoherent pulses of electromagnetic radiation at or near the same frequency; to provide method and means for establishing the critical resonance threshold effect of traveling wave pulse or pulses, in time sequence, with initially unexcited vibrators contained in media into which the pulses are transmitted; to provide a means for monitoring the pulse or pulses after having traversed the media and to sense the intensity of said pulses relative to the intensity of the input pulse or pulses; to provide means and method for relating and correlating properties of time delay, phase shift, frequency, pulse shape, pulse width, beam direction, birefringence effects, and plurality of pulses with respect to these same properties of the input pulse or pulses and the properties of the resonant medium through which the input pulses pass; to provide means for chemical and physical analysis of media containing constituents which are resonant to the incoming pulsed radiation, including frequencies as low as radiofrequency and extending through the optical range, which excite resonators of magnetic dipole or electric dipole in character, or both; to measure the decay of pulses of coherent radiation above the threshold condition as a function of target media or sample concentration of resonators, length of sample, or as a function of other physical conditions such as temperature, pressure, annealing (of solid), external electric and magnetic fields, in order to carry out chemical qualitative and quantitative analysis; physical assessment of matter properties, be the matter liquid, solid, or gas; to provide means for monitoring the delayed, coherent electromagnetic wave pulses in the resonant medium for purposes of digital memory storage and for their recirculation back into the input of the medium for computer purposes; to provide method and apparatus for delaying, shaping, and changing the frequency spectrum of coherent traveling waves; to provide coherent pulse storage and logic method and apparatus.

These and other objects of the invention will become apparent from the following description when taken in conjunction with the accompanying drawings.

DESCRIPTION OF THE DRAWINGS

Referring to the drawings:

FIG. 1 is a graph depicting branch solutions to the equation covering traveling wave propagation through resonant medium in accordance with the invention.

FIG. 2 is a plot of the electric field intensity versus distance (z) through the resonant medium and is a function of time for nonpropagating conditions.

FIGS. 3A and 3B and 3C are plots of the electric field intensity versus distance (z) through the resonant medium and time for various propagating conditions.

FIGS. 4 and 5 are graphs depicting the output pulse wave shape as a function of the input wave pulse bandwidth versus the medium resonance bandwidth.

FIG. 6 is a diagrammatic view of apparatus by which the invention was put into practice.

FIG. 7 is a set of energy level diagrams for the apparatus of FIG. 6.

THEORETICAL DESCRIPTION

Figure 8:
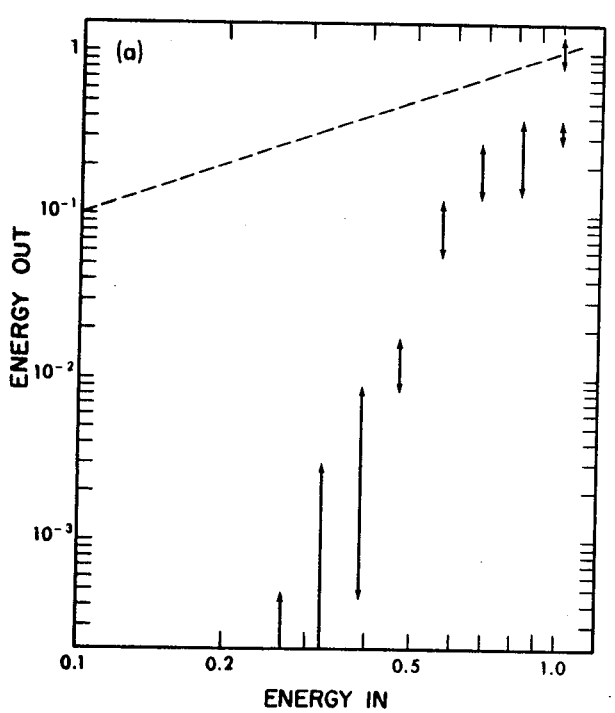
FIG. 8 is a bar graph depicting the output energy of the apparatus of FIG. 6 as a function of the energy of the input signal.

In order to facilitate the explanation and understanding of the invention, there follows a brief simplified treatment using an analogy to a mechanical system of pendulums. After this, a more complete and rigorous treatment based upon electromagnetic theory and quantum mechanics is given.

The essence of the invention can be understood by reference to an analogy which is not literally in correspondence in all respects with the actual phenomenon of the critical pulse transmission effect, but is helpful nevertheless. Consider first a ball of given mass M which is rolled with a certain initial velocity V along a grooved track. The ball has a certain energy which we shall assume compares to the energy of a given light pulse, for example. Let us consider next a sphere of like mass M' suspended on one end of a rigid weightless rod, and the other end of the rod is fixed on a pivot above this mass, so that the combination behaves as a rigid pendulum. Let M' be suspended in the path of the rolling ball M, so that upon impact of M with M', the pendulum will swing in an arc which is planar with the trajectory of M on the track. Let the pendulum with M' represent a typical resonator in the aforementioned optical medium, ready to be excited by the impinging light pulse, represented by the moving mass M. If M has a velocity $v_1$ (neglecting friction) less than a critical velocity value $v_c$, M will strike M', and M' will swing in an arc out of the way of M after the impact. Mass M will continue forward in its rolling trajectory at a diminished $v_1' < v_1$ after the impact. If a succession of such pendulums are placed in the path of M, the mass M will eventually come to rest, which is representative of absorption of the light pulse. The condition for pulse transmission above the critical threshold has its analogy in the condition that the mass M now strikes M', now as a more powerful pulse, with a velocity $v_1 \geq v_c$, so that the pendulum swings through an arc just slightly greater than 180° or $\pi$ radians. The model is designed so that at this critical "$\pi$" condition, mass M comes completely to rest after the impact with M'. All of the energy originally in M is now momentarily contained in M'. However M' of the pendulum swings down from its vertical position at $\pi$ through angle $\theta$ greater than 180°, and strikes M, giving it a renewed impact momentum in the same forward direction at which M originally struck M'. Mass M with its renewed energy and momentum can now repeat this process with additional pendulums down along the line of its trajectory, and the mass M can pass through the resonating pendulums. The analogy shows how the pendulum absorbs energy from the ball at a first impact. But after the pendulum swings around beyond the critical 180°, "$\pi$" condition, the ball recovers this energy (neglecting friction). The pendulum now emits the energy it previously absorbed, a take and give process with respect to the ball M. The process with a light pulse traversing a resonant medium is remarkably similar to the above analogue, but of course the mechanical analogue does not describe all aspects of the effects resulting from the invention.

The above-mentioned critical absorption-emission transmission of a light pulse is consistent and analogous to a precise prediction of electromagnetic theory when coupled to the quantum mechanical equations of motion of the two level atomic system resonance to incoming light. When the pendulum is at rest, waiting for a collision, we mean that the atoms in a small portion of the medium, in the front entry face, let us say, are in the optical, unexcited ground state. The collision occurs when the light enters and excites the electrons from their ground toward excited states. The electric field E in the traveling wave pulse must act for a sufficient length of time $\tau$ upon the electrons so that they are excited completely from the ground state into the excited state. The transparency effect, however, will take over only if the optical excitation is sufficient to make the electrons overshoot, at least initially, so that they return, ever so slightly back toward the ground state by an amount $\Delta$ radians. In this language of the optical pendulum, the electrons undergo a $\pi+\Delta$ excursion, if the initial pulse has sufficient area so that $$\theta = K \int_{-\infty}^{\infty} E\,dt = \pi + \Delta,$$

where K is a constant which is a measure of the dipole strength of the optical oscillator. For additional reference, the reader is referred to the following articles in which the terminology which exemplified origin and development of the area inangular terms; Spin Echoes by E. L. Hahn, *Physical Review*, Volume 80 No. 4, pages 580 to 598 dated Nov. 15, 1950, particularly page 583 and the associated discussion, and Pulse Techniques and Microwave Spectroscopy by R. H. Dicke and R. H. Romer, *The Review of Scientific Instruments*, Volume 26, No. 10, October, 1955, particularly pages 916 and 918. If $\theta = \pi - \Delta$, for example, the transparency effect will not occur and the pulse will be absorbed in the medium. We assume, of course, that no friction is present relating to random spontaneous emission or phonon relaxation due to thermal vibrations. Even so, losses will occur because the atoms remain excited and capture the energy originally contained in the pulse. For the condition $\theta = \pi + \Delta$, the incoming pulse, of course, loses some energy, proportional to $$\int_{-\infty}^{\infty} E^2\,dt.$$

But as it travels forward into the medium, the overall pulse area increases because the emission cycle of the optical excitation adds area to the lagging edge of the pulse, in spite of the pulse energy loss due to absorption during the leading edge. Therefore the area $$\theta \sim \int E \, dt$$

increases permissibly, even though $$\int E^2 dt$$

decreases. As the pulse traverses further into the medium the area $\theta$ approaches the value 2, and the energy loss $$\int E^2 dt$$

approaches zero. Consequently, the pulse proceeds thereafter undamped and reshaped into a smooth symmetrical shape. FIG. 1 in the enclosed technical description shows the behavior of the pulse area dependence upon distance $z$ and time $t$ for cases $\theta = \pi - \Delta = 0.9$ and $\theta = \pi + \Delta = 1.1$. The change in $\theta$ as a function of distance $z$ is given in FIGS. 2 and 3A–C. If the pulse is not initially a "2 pulse," but is at least greater than "$\pi$," the initial loss in energy from the pulse is not necessarily severe, and a considerable portion of the pulse power may still remain after the pulse has become stable.

In the following discussion electromagnetic theory and quantum mechanics are taken into account. Let a pulse of coherent light having a duration, hereinafter termed pulse width $\tau_p$, impinge on a medium of optically resonant matter. For times $\tau_p$ short compared to $T_2'$, the inverse of the homogeneous broadening contribution to the optical line width $1/T_2$ of the medium, the pulse propagates. The basic propagation effect is formed from the following analysis for a limiting case of a coherent plane wave, taken to be circularly polarized so that:

$$\overline{E}(z,t) = E(z,t) \, [\hat{i} \cos(\omega t - kz) - \hat{j} \sin(\omega t - kz)] \quad (1)$$

where the electric field $\overline{E}$ propagates in the $z$ direction with frequency $\omega$, $k = 2\pi n/\pi$, $\pi$ is the vacuum wavelength, and $n$ is the constant refractive index of the medium. $E(z,t)$ is assumed slowly varying so that $(\delta E/\delta z) << (E/\pi)$ and $(\delta E/\delta t) << \omega E$. Let the medium include N solute ions per cm³ in the optical ground state and present a two level, inhomogeneously broadened symmetric spectral distribution function $g(\Delta \omega)$ to the driving pulse; and the center of the spectrum is tuned to frequency $\omega$, with ions defined off-resonance by amount $\Delta \omega$. The condition $\omega^{-1} << T_2^* << \tau_p << T_2'$ is assumed, where $T_2^* \approx g(0)$ is the inverse inhomogeneously broadened line width caused by a spread of local static crystalline fields, and $1/T_2 \sim 1/T_2' + 1/T_2^*$. In the language of magnetic resonance, the two level system can be represented by an effective macroscopic electric dipole moment $\overline{P} = \hat{u}_o u + \hat{v}_o v - \hat{w}_o (XK/\omega)$, where $u_o$, $WK_o$, $w_o$ are orthogonal unit vectors in the fictitious reference frame rotating at frequency $\omega$ about the $\hat{w}_o$ direction. At a particular $\Delta \omega$, $\overline{P}$ is described by the equation $$(d\overline{P}/dt) = \overline{P} \times (\hat{u}_o k E + \hat{w}_o \Delta \omega). \quad (2)$$

In the undamped Bloch equation notation (F. Bloch, Phys. Rev. 70, 460 (1946)), electric dipole absorption $v$ and dispersion $(u)$ components combine with a third component $-(KW/\omega)$ (in place of $M_z$), where $W$ is the ion energy spectral density per cm³, $k = 2p/n$, and $p$ is the $x$ or $y$ component of the electric dipole moment of the transition. In general, any combination of $\sigma\pm$ and $\pi$ optical transitions may be handled by this model. For simplicity, there is considered here only the behavior of moment $\overline{P}$ induced by one circularly polarized component $E(z,t)$. After any pulse, the vector $P$ with $\Delta \omega = 0$ is turned through a net angle $$\theta = K \int_{-\infty}^{\infty} E(z,t) \, dt. \quad (3)$$

However, $E(z,t)$ is determined by its initial form at $z = 0$, and by the superposition of all the dipole sources throughout the spectrum, as seen from the reduced Maxwell equation for the forward traveling wave:

$$\frac{\partial E(z,t)}{\partial z} + \frac{n}{c} \frac{\partial E(z,t)}{\partial t} = \frac{-2\pi\omega}{nc} \int_{-\infty}^{\infty} g(\Delta\omega) v(z,t,\Delta\omega) d(\Delta\omega) \quad (4)$$

where $c$ is the speed of light in vacuum, $$\int_{-\infty}^{\infty} g(\Delta\omega) d(\Delta\omega) = 1,$$

and $|(\delta \overline{P}/\delta t)| << \omega |\overline{P}|$. For weak pulses of coherent or incoherent light which do not significantly alter the ground state population, the decay in intensity at frequency $\omega$ is given by $$E^2(z) = E^2(0) e^{-\alpha z}, \quad (5)$$

where $\alpha = (8\pi^2 p^2 \omega g(0) N/nkc)$.

Upon coupling Eq. (2) with (3) and (4) we obtain, for large coherent light intensities the result:

$$d\theta/dz = -\alpha/2 \sin\theta, \quad (6)$$

which has the solution $$\tan(\theta(z)/2) = (\tan \theta_o/2) \exp(-\alpha z/2). \quad (7)$$

Eq. (5) follows from Eq. (7) in the limit of small $\theta$. Here $\theta_o$ is the rotation angle for those ions with $\Delta \omega = 0$ at $z = 0$, the entry face plane of the medium.

The branch solutions of $\theta$ versus $z$ from Eq. (7) are plotted in FIG. 1. For a given $\theta_o$ the medium entry plane is assigned the corresponding $z$ which defines $z = 0$ in Eq. (1). For the sample initially in the excited state, $\theta$ evolves in the $-z$ direction. Units of $z$ are in multiples of $\pi\alpha^{-1}$.

Plots for E versus z and t are shown in FIGS. 2 and 3A for cases $\theta_o = 0.9\pi$ and $\theta_0 = 1.1\pi$, with arbitrary pulse widths. Initial shapes are chosen to be Gaussian. The unit of time is conveniently chosen in terms of input pulse width $\sim \tau_p$. For fixed $\theta_o$, units of E are determined from Eq. (3). Units of z are in multiples of $\pi\alpha^{-1}$.

For initial pulse areas $\theta_o < \pi$, below the critical area at $\theta_o = \pi$, the pulse area diminishes toward $\theta(z) = 0$ for increasing z in FIG. 1, as shown for $\theta_0 = 0.9\pi$ in FIG. 3. Above the critical area, a $\theta_0 = 1.1\pi$ pulse increases in area $$(\theta(z) \sim \int E \, dt)$$

toward the limit $2\pi$, when $(d\theta/dz) = 0$. During this process the pulse loses some energy $$(\sim \int E^2 dt)$$

over a number of absorption lengths $\alpha^{-1}$ and is reshaped. The $2_\pi$ pulse formed appears to be the traveling wave pulse given by $$E(z,t) = 2/K\tau \text{sech}[1/\tau (t - z/V)], \quad (8)$$

and is unique in that it represents the only finite energy pulse solution to Eq. (4) which is unattenuated and retains its shape. The induced polarization radiates in such a way as to produce the same field pulse given above. $V$ is the pulse velocity, and $\tau$ is the final pulse width. The final pulse energy in this undamped model is conserved because any optical ion, independent of its assigned $\Delta\omega$, is momentarily excited from its ground state to a coherent superposition of ground and excited states, and then is returned completely to the ground state after the pulse has gone by. Pulse retardation or delay occurs because the pulse is depleted in energy at its leading time edge during absorption, but the absorbed energy is returned to the lagging edge during emission. Calculations show that a given arbitrary input pulse with $\theta_0 \sim 2_\pi n$ divides into $n$ separate $2_\pi$ pulses of the shape given by Eq. (8), after traversing some distance into the medium.

The solution to the coupled Equations (2) and (4) for a pulse of the form (8) may be found without the assumption that $T_2^= \ll \tau_p$. The components of $\overline{P}$ are $$v(\Delta\omega, z, t) = \frac{Np \sin \varphi}{1 + (\Delta\omega\tau)^2}$$

$$u(\Delta\omega, z, t) = \frac{2Np\Delta\omega\tau \sin \frac{\varphi}{2}}{1 + (\Delta\omega\tau)^2}$$

$$\frac{K}{\omega} W(\Delta\omega, z, t) = \frac{Nk\omega}{2} \left[ \frac{2 \sin^2 \frac{\varphi}{2}}{1 + (\Delta\omega\tau)^2} - 1 \right] \frac{K}{\omega} \quad (9)$$

with $$\varphi = K \int_{-\infty}^{t} E(z,t) dt = 4 \tan^{-1} \left( \exp \left[ \frac{1}{\tau} (t - z/V) \right] \right)$$

This solution would also apply to any magnetic moment $\overline{M(\Delta\omega)}$ in a magnetic resonance pulse experiment where the imposed rf cavity pulse field $H_1(t)$ is of the form of Eq. (8).

The reciprocal pulse velocity is found to be $$V^{-1} = \frac{n}{c} + \frac{\alpha\tau^2}{2\pi g(0)} \int_{-\infty}^{+\infty} \frac{g(\Delta\omega) d\Delta\omega}{1 + (\Delta\omega\tau)^2}, \quad (10)$$

which reduces to $V^{-1} \cong (\alpha \tau/2)$ for $T_2^* \ll \tau$ and $\alpha\tau \gg n/c$. The special results (8), (9), and (10) are valid for nonsymmetric $g(\Delta\omega)$ if k in Eq. (1) is replaced by $$k' = k + \frac{\alpha\tau^2}{2\pi g(0)} \int_{-\infty}^{+\infty} \frac{\Delta\omega g(\Delta\omega) d(\Delta\omega)}{1 + (\Delta\omega\tau)^2}. \quad (11)$$

In actual practice the light pulse enters the medium with non-uniform intensity across the beam. Any small portion of the wave front can be assumed to obey the predictions of the plane wave model above for short distances. Small cross sections of the beam will tend to develop and maintain the $2_\pi$ condition. Consequently the more intense portions of the beam will exhibit shorter pulse delay times, and less intense portions will exhibit longer delay times. Diffraction effects neglected here will become important after some distance of propagation, particularly in those regions of the beam which become sharply collimated.

Assuming phenomenological damping terms added to Eq. (2) in a manner following Bloch, (F. Bloch, Phys. Rev. 70, 460 (1946)), we find for $T_2^* \ll \tau \ll T_2', T_1$ that $$(dT/dz) = -(4_\pi/3) NK\omega g(0) (1/T_1) + (2/T_2)', \quad (12)$$

where $T_1$ is the energy damping time constant, and the pulse energy per cm² is given by $$T = \frac{nc}{4\pi} \int_{-\infty}^{\infty} E^2 dt. \quad (13)$$

The constant loss rate is proportional to the product of the pulse delay time $\alpha\tau/2$ per unit sample length and the fraction $T_2^*/\tau$ of the ions excited. The pulse is assumed to deviate only slightly from the form (8) for a plane wave, and diffraction effects are neglected. However, the dependence of $k'$ on $\tau$ (and therefore the pulse intensity) indicates the existence of an instability effect similar to self-focusing for $\omega$ applied to the high frequency side of the resonance line. The reverse focusing tendency should occur on the low frequency side.

In actual practice, the medium presents optical resonances or opacity to light in which the energy is irreversibly dissipated in the form of thermal vibrations and spontaneous emission. One then asks whether the medium still permit coherent light pulses to pass through with less attenuation than if the light were incoherent, i.e., from ordinary lamp sources. The answer is that the medium will be more transparent to the light the shorter the light pulse duration time $(\tau_p)$ is with respect to the random damping relaxation time $(T_2')$ of the optical resonance; that is, the condition $T_2' \gtrsim \tau_p$ should hold. If any opaque medium therefore is an impediment to ordinary incoherent light pulses, then coherent light pulses should transmit energy, to some degree, through to the other side of the medium boundary, depending upon how short the pulses are. The decay of such coherent pulse intensities will not be exponentially decreasing for $T_2 > \tau_p$, but at a slower rate, reaching essentially a decay proportional to distance through the medium for $T_2 \gg \tau_p$, but $T_2$ finite. It must be kept in mind that the resonance linewidth of the medium may be statically broadened (inhomogeneous broadening) because of a static distribution of two level resonance transitions, and still permit $T_2$ to be rather long. For example in free atoms $T_2$ is typically $10^{-8}$ seconds. However, present technology is capable, by "-mode locking" laser techniques, of producing coherent optical pulses as short as $\tau_p = 10^{-12}$ to $10^{-13}$ seconds in width. Therefore, the enhancement of transmission of coherent light pulse, or similar effects of other electromagnetic or phonon (sound wave) radiation, suggests the potentiality of applying this invention to communication by laser beams, for example, through clouds and other opaque media, or through denser media which are reasonably homogeneous in character.

Even though the pulse should be shorter than the relaxation time of the medium, it is expected that a practical pulse duration for practicing the invention would be preferably less about one-tenth of the relaxation time of the media. Since gases at ambient temperature have relaxation times of the order of $10^{-8} - 10^{-11}$ seconds and solids and liquids have relaxation times of the order of $10^{-3} - 10^{-13}$ seconds, it is seen that the mode locked laser pulse referred to above is adequately short.

Referring now to FIGS. 4 and 5, when the bandwidth of the input pulses 30 satisfying the critical condition is less than that of the resonance 32, the output 34 is one or a sequence of $2\pi$ pulses (FIG. 4). However, when the bandwidth of the input pulse 36 is greater than that of the resonance 38, the output pulses 40, as a function of time, exhibit ringing (FIG. 5) and appear as oscillations having a changing period, which may be damped, or modulated.

Our calculations predict this effect under conditions when the oscillators are not excited weakly but very strongly, that is, in a region where the pendulum does not oscillate with a constant period but with a nonlinear period because of deviation pendulum in angle is not small. The oscillation period is changed and the initial amplitude should as well give information about the width of the atomic resonance and about the concentration in some contour shape which would be related partially to the shape of the input pulse. This is particularly true if the pulse width itself happens to be comparable to the dampening time of this pendulum.

It should be noted however that the invention is not limited with respect to the shape of the input burst (pulse) except that the area, $\theta$, whatever it is, is greater than $\pi + \Delta$, and satisfies the relaxation condition of being less than the relaxation time of the resonant media. For example, let an initial pulse area appear in shape as though it were a sequence of very short pulses. If these pulses taken together satisfied the area therein and the duration condition, then the invention predicts the area of the output pulse and predicts that it will propagate through the medium. Our invention specifies the total area of the output signal. Accordingly, the invention specifies what happens to the total area of the output signal, and is not specific to any particular pulse within that area, although, for simplicity, a single input pulse has been described and is a special case.

FIGS. 3B and 3C show the type of propagation that results from pulses having areas significantly larger than $\pi + \Delta$. Thus, FIG. 3B shows an input pulse of $2.9\pi$ area which reshapes into a $2\pi$ pulse as it propagates through the resonant medium. In so doing, the peak electric field and peak power increases, and the duration decreases. FIG. 3C shows the reshaping of a $3.6\pi$ pulse into two $2\pi$ pulses, the first one having short duration and delay, while the other has an increased duration and delay as it develops from a $1.6\pi$ pulse to a $2\pi$ pulse.

EXPERIMENTAL EXAMPLE

The predictions of the above models have been qualitatively confirmed by experiment. Referring to FIGS. 6 and 7, there is shown the experimental apparatus by which the invention was put into practice utilizing electromagnetic energy in the visible region. Thus, there is provided a laser source 42 having an output burst pulse 43 which is controllable in amplitude and duration by suitable burst width and amplitude controls 44, 46 provided on the apparatus. The burst pulse 43 from the laser passes successively through an optically aligned system including an attenuator 48, a resonant medium 50, an attenuator 52 and a photosensor 54 which may be a photographic camera. The resonant medium 50 consisted of an elongate rod of ruby having the composition 0.05 percent chromium $Cr^{+3}$ in a crystal of $Al_2O_3$. The rod had dimensions of one-half inch in diameter and 2-¾ inch in length and had a relaxation time $T_2 = \sim 10^{-10}$ seconds and was cooled in apparatus 56 to liquid helium temperature. FIG. 7 shows the energy level diagrams for the source and the resonant medium.

The laser source 42 was a Q-switched liquid nitrogen cooled ruby laser suitably controlled to provide only the plane polarized $\overline{E}\ (2E) \rightleftarrows 4A_2(\pm 3/2)$ output laser line. By thermal tuning this transition it was made resonant with the $4A_2(\pm 1/2) \rightleftarrows \overline{E}\ (2E)$ transition of the resonant medium 50 with its optical C axis in the z direction. Input energies ranged from about 3 millijoules at 10 nanoseconds for delay experiments to 5 millijoules at 20 nanoseconds for transmission threshold studies.

FIG. 8 illustrates the nonlinear transmission effect for various input light intensities into the resonant medium of FIG. 4. Weak light, well below the onset of nonlinear transmission, was attenuated by more than a factor of $10^5$. The graph reveals there is a reduction or attenuation by a factor of 4 in the output pulse energy for a change in input energy of a factor of 6. The vertical bars represent the magnified output which is measured by attenuation until photographic film is unexposed, and determines the peak transmitted energy per square centimeter. The vertical bars also indicate the experimental error assumed to be due to output fluctuations probably caused by uncontrolled characteristics of the ruby laser source and the step type output attenuation calibration. The dashed line represents the expected response if a linear transmission law were applicable.

Figure 9:
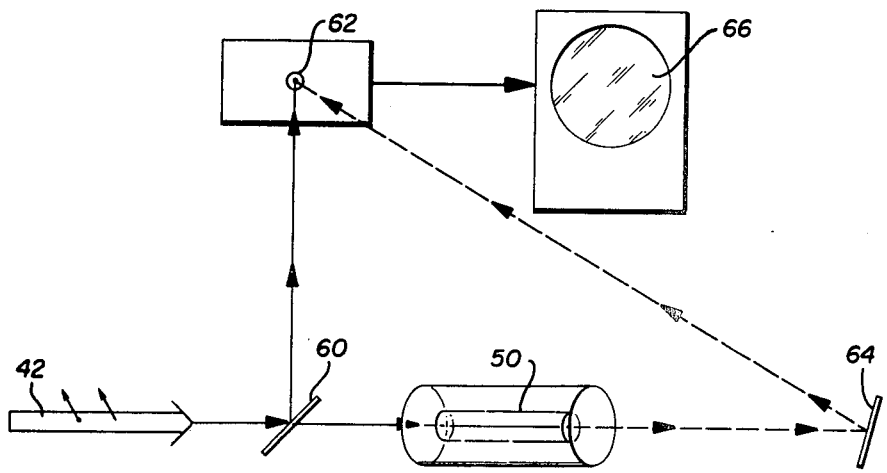
FIG. 9 is a diagrammatic view of a modified form of apparatus incorporating the invention and used for comparing the strength of the input and output signals.

FIG. 9 shows the modified arrangement of the apparatus which was used to compare the input and output signal pulses as applied to the medium. Thus, the apparatus is similar to that shown in FIG. 6 including laser source 42 arranged to provide output coherent light burst pulses directed into resonant medium 50 of a ruby rod. A half mirror beam splitter 60 intercepts a portion of the laser input pulse 43 and sends it to the photodiode detector 62. A mirror 64 directs the output light pulse passed by medium 50 to detector 62 so that the detector output is responsive to both the input and output light pulses. The detector converts the light burst pulses into pulses representing the envelope of the signals which are then displayed on an oscilloscope 66 as a function of time.

Figure 10:
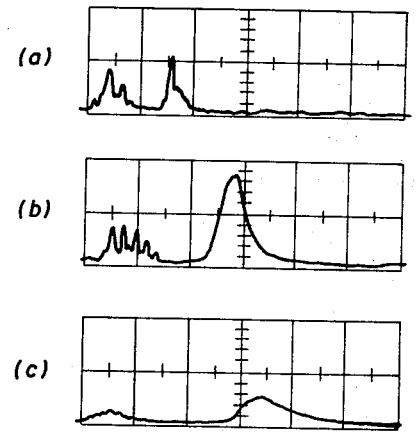
FIGS. 10A through 10C are oscillograph traces of the input and output signals obtained from operation of the apparatus of FIG. 9.

FIGS. 10A, B and C show the oscilloscope traces for various experimental conditions using the arrangement of FIG. 9. FIG. 10A shows the input and output pulses with the medium 50 at room temperature. Since the pulses were coincident a delay was used to separate the two pulses, the second of which travelled through the medium 50. In the graph of FIG. 10B the medium has been thermally cooled by liquid helium temperatures. As shown, the pulse which has travelled through the medium has been delayed thereby (no other delay was used).

FIG. 10C shows the output pulse wave shape and illustrates a greater delay caused by increasing width of the input pulse. The delay of the pulses is qualitatively in accordance with equation (10) since it increases with pulse width.

For the particular transitions used in this experiment the transmission effect of the invention diminishes with increasing sample temperature, disappearing completely at 40° K, where the rapid Orbach relaxation between the upper levels $2\bar{A}$ $(2E)$ $\rightleftarrows$ $\bar{E}$ $(2E)$ imposes a condition $T_2' \gtrsim \tau_p$. At the same time the thermal shift of the optical resonance only amounts to about one-fourth of a linewidth and the light is nearly completely attenuated.

The transmission behavior might be interpreted as an effect in which the absorption line is saturated by the leading edge of the pulse, sometimes termed hole burning. However, a population rate equation description of the above experimental observations would not be valid because damping times are long at liquid helium temperatures for ruby, and the large pulse delay times cannot be counted for by a rate equation model.

ENERGY TRANSMISSION SYSTEM

Figure 11:
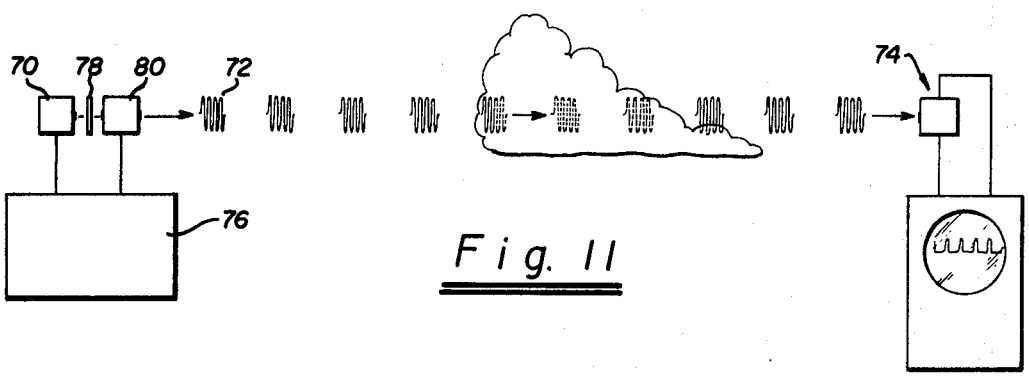
FIG. 11 is a diagrammatic view of a system for the transmission of electromagnetic wave pulse over long distances, constructed according to the invention.

Referring to FIG. 11 there is shown the application of the invention to the transmission of electromagnetic energy over long distances and through atmosphere which may contain clouds, fogs, or other absorbing media. Thus, there is provided a coherent electromagnetic energy source 70 such as a maser capable of delivering output bursts 72 of coherent electromagnetic energy. The bursts can be made adjustable with respect to amplitude and duration as hereinbefore described so that the critical conditions can be achieved. There is also provided a receiver 74 of electromagnetic energy which can be of any suitable type. The source 70 and the receiver 74 are suitably mounted in line of sight locations such as atop high structures or natural sites which are spaced apart a considerable distance.

Means is provided for imposing a signal on the pulses being transmitted through the medium and can consist of conventional means for varying the pulse width, the intensity, or the polarization of the pulses in such a manner that selected pulses do not satisfy the propagation condition while others do.

Specifically, there is provided a programmer 76 which supplies trigger signals to cause the laser to put out a sequence of pulses which are plane polarized or are passed through a polarizer 78. The pulses then pass through a Kerr cell 80 which is controlled by programmer 76 so that selected pulses are eliminated by crossed polarization. In this way, the transmitted pulses can be modulated by conventional methods such as pulse position modulation (PPM), pulse count modulation (PCM), and pulse frequency modulation (PFM). Because the individual pulses satisfy the critical propagation conditions as to duration and strength for the interfering weather, the information thereon will pass through such weather without being absorbed out and the transmission link will be maintained.

DELAY, STORAGE, AND LOGIC SYSTEMS

A most useful property of the invention is the time delay which is imposed upon the coherent pulse as it passes through the medium. For a given pulse width $\tau_p$, the time delay $T$ is given roughly by $T = L/v = L\alpha \tau_p/2$ where $L$ is the medium thickness and $\alpha$ is the classical optical absorption coefficient which would apply to the absorption of an ordinary weak pulse of incoherent or coherent light. Depending upon the size of $\alpha$, light time delays of $T$ approximately $10^{-6}$ to $10^{-8}$ seconds are readily achievable. Accordingly, the apparatus of FIG. 6 is also a delay line in accordance with the length $L$ of the resonant medium through which the pulses pass.

Figure 12:
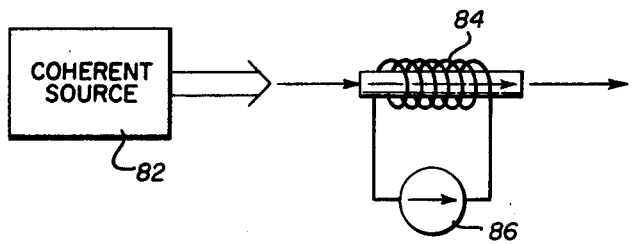
FIG. 12 is a schematic diagram of apparatus for adjustably delaying coherent wave pulses constructed according to the invention.

Referring to FIG. 12, there is shown apparatus in which the amount of the delay is varied with a fixed medium 82 of given length by applying a varying biasing magnetic field to the medium with a coil 84 and current source 86 in order to change the variable $g(0)$. This variable is proportional to $\alpha$ and which represents the population of excitable species at a particular frequency. When the biasing magnetic field is applied to the medium a greater delay is encountered since fewer excitable species are available due to the broadening of the resonance line shape of the medium.

The delay may also be varied by the means for changing the pulse intensity as applied to the medium or its duration as in FIG. 6. It is found that shorter pulses propagate faster through the medium. As illustrated in FIG. 1, pulses having areas between $2\pi$ and $3\pi$ shorten in duration as they pass through the medium in order to obtain the $2\pi$ condition. Accordingly, by varying the pulse amplitude and its duration the delay also varies.

Figure 13:
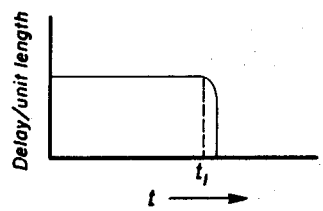
FIG. 13 is a graph of the delay properties of the apparatus of FIG. 12 when operated as a storage device.

The delay line apparatus of FIG. 12 can be operated to provide a short time storage element for use with optical pulses. If source 86 is sufficiently energized, the medium and bias field can be selected so that a magnetic shift off resonance occurs by an amount sufficient to make the medium transparent to the pulses. Thus, a series of pulses may be introduced into the medium wherein they are delayed for short times. When it is desired to obtain the pulse stored in the medium as an output the resonance shifting field is applied so that the material becomes transparent. FIG. 13 depicts the delay per unit length as function of time and shows that upon application of the field, at time $t$, the medium becomes transparent and the pulses stored become immediately available at the output.

Figure 14:
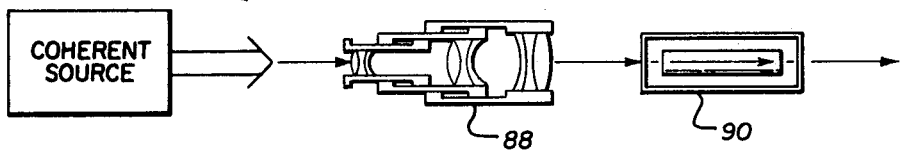
FIG. 14 is a schematic diagram of another form apparatus for adjustably delaying coherent wave pulses constructed in accordance with the invention.

FIG. 14 shows a light delay line apparatus in which the output of the laser source is passed through a means for varying the beam cross section such as a zoom lens 88 having a variable focal length after which it impinges upon the resonant medium 90. When zoom lens 88 expands the beam cross section, the delay will increase as the power density decreases. By increasing the power density the critical condition can be exceeded and the output varied even to the point of producing multiple output pulses.

MULTIPLE DELAY AND STORAGE

Figure 15:
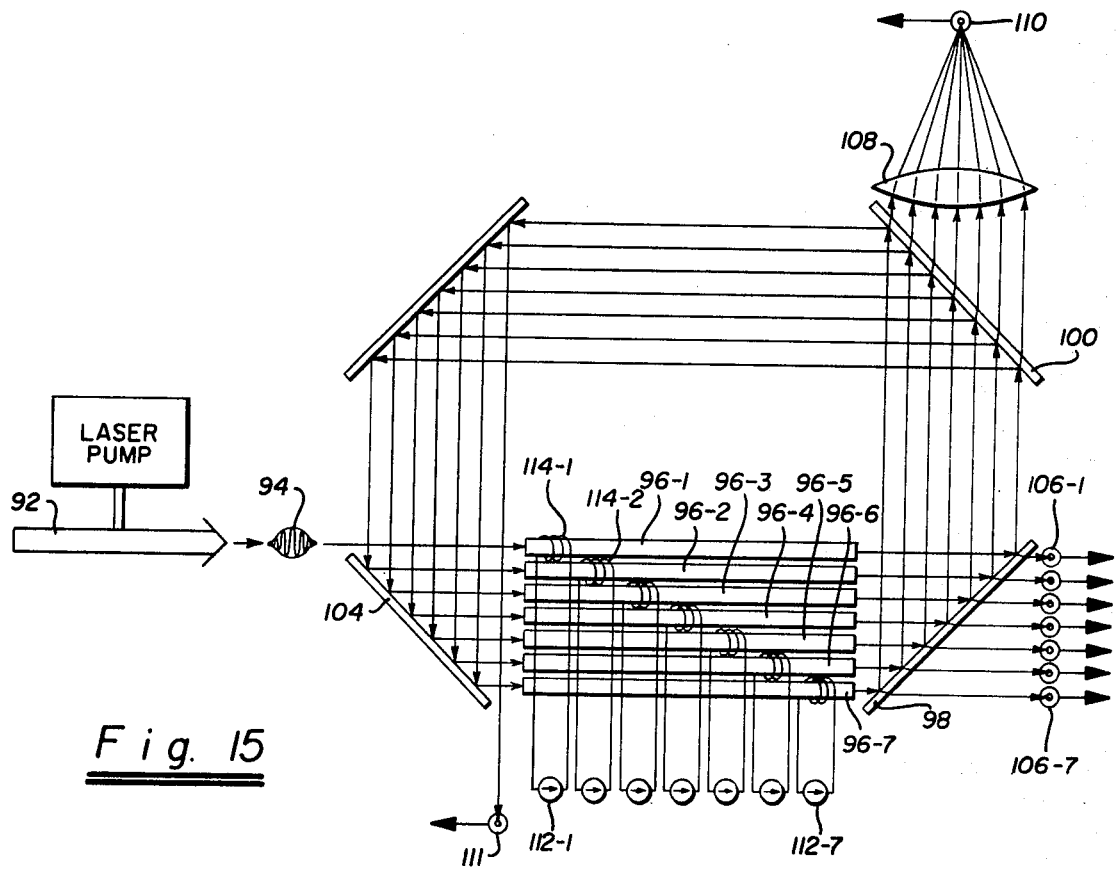
FIG. 15 is a diagrammatic view of delay and storage apparatus constructed according to the invention and useful in computer applications.

Referring to FIG. 15, there is shown a system in which delayed light pulses are stored as a digital information and selectively retrieved. Thus, there is provided a laser source 92 which is pumped to provide a coherent light output pulse 94 satisfying the critical conditions previously described. The output pulse is directed through one channel of a resonant medium 96 which is identified as channel 96-7. After passing through channel 96-7 it is reflected in turn by mirrors 98, 100, 102 and 104 into an almost rectangular race. The mirrors are so positioned that the light pulses successively pass through adjacent channels 96-6,..., 96-1 of media 96. Mirrors 98 and 100 are partially transmissive so that certain of the pulse information will be passed through such mirrors. Partially reflective mirror 98 serves to permit a portion of the pulse to be passed onto detector 106-7 which registers as a pulse number 7 early in time $t$. Detector 106 provides information regarding the existence of a pulse in any channel at any particular time.

A portion of the pulse can also be transferred through the beam splitter or partially reflective mirror 100 to concentrating lens 108 to impinge on detector 110 as shown. The output detector 110 is the sum of all channels at a particular time. The remainder of the pulse is deflected by mirror 100 and passed on channel 6 through the resonant medium on channel 96-6 so that the process which effected the pulse on path 7 now effects the pulse on channel 6 except that there has been introduced a delay. The relative delay between the various pulses in channels 1 to 7 is variable as by varying the input pulse widths or by biasing, as hereinafter explained. After the pulse has passed through all the channels, it is permitted to leave the race and impinge upon detector 111, the output of which is a real time output of the pulses passing through the apparatus.

The presence or absence of a pulse can be predetermined by whether or not the medium is sufficiently coherent in response with respect to the pulses. Thus, the medium 96 can be modulated as by applying bias magnetic fields thereto with current sources 112-1...112-7 and coils 114-1...114-7 in the manner previously described in connection with the embodiment of FIG. 12. Alternatively, the incoming pulses can be individually modulated in intensity, phase, or sense of polarization in order to achieve a desired pulse modulation of the output. Accordingly, the above system is useful for storing digital information in light pulse form and for retrieving it.

OPTICAL LOGIC

Figure 16:
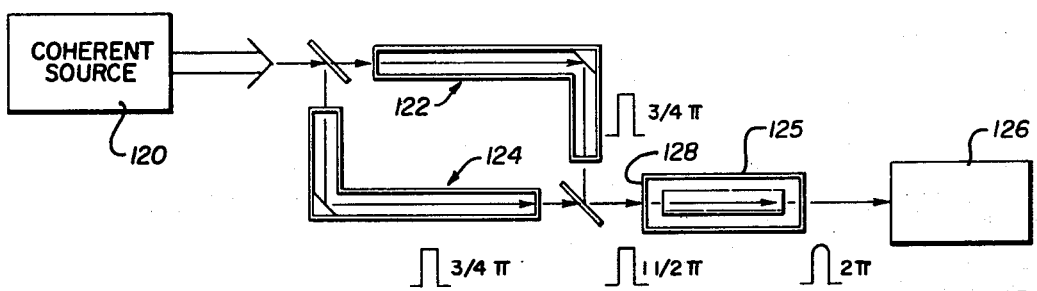
FIG. 16 is a diagrammatic view of apparatus performing logic constructed according to the invention.

Referring particularly to FIG. 16 there is shown apparatus for performing logic functions with a form of the invention operating in the optical region. Thus, there is provided a coherent source 120 which is coupled to the inputs of parallel optical signal paths 122 and 124. After the light traverses either of the optical signal paths 122 and 124 it is passed into a resonant medium 125 so that the light cooperates to produce a pulse within the medium which is the sum of the input pulses. The output of the resonant medium is passed to a receiving mechanism 126 which may be a light detector but which would usually be downstream portions of a computer system.

In operation, the coherent source generates light pulses having a value such that there is selectively created in each of the optical signal paths pulses having an area of less than $\pi$, say for example $3/4\pi$ as shown but a duration shorter than the relaxation time. If each of the input signals is energized to permit passage of the pulses, they will appear at the input face 128 of the resonant medium, (a pulse having an area of sufficient magnitude to develop a 1-¼$\pi$ greater than $\pi + \Delta$). Such a pulse will propagate and become a $2\pi$ pulse as it passes through the resonant medium and will be received by the receiver. If, however, either or both of the inputs A and B are not present the respective resonant medium will absorb whichever pulse is present because it absorbs any single pulse having an area less than $\pi$. Accordingly, there has been shown an optical realization of an AND logic gate. As is well known, the use of De-Morgan's theorems, permits the construction of a complete Boolean logic system from this single realization (AND).

If one pulse were made to have a very short duration, it would travel faster through the resonant medium 125 and accordingly would combine with an already present pulse of longer duration and delay. The latter could be termed the stored pulse. In such an interaction the short, second pulse would take up energy from the first pulse and step on ahead of it. Furthermore, in again reestablishing the $2\pi$, it would have to shorten its duration. For this reason it would travel faster than otherwise and its time of arrival at the output could be taken as a direct logic function indicative of both signals. Additionally, such a scheme eliminates the need for simultaneous signals.

PULSE SHAPERS

In general, the pulse passing through the resonant medium will be affected in many of its properties in accordance with the nature of the medium. This leads to a class of devices which are termed pulse shapers and which include mechanisms for changing the intensity, shape and frequency content of the light pulse that passes through the resonant medium. The following operations may be carried out with the apparatus of FIG. 12.

Referring to the graphs shown in FIGS. 3A, 3B, 3C, it is noted that a pulse having an area lying between $\pi$ and $2\pi$ is gradually developed into a pulse having an area $2\pi$ after a short distance of propagation through the medium. In this case, the pulse duration is broadened as shown by the graphs 3B and the intensity decreases. Accordingly, if it is desired to reduce the intensity of a pulse and/or to increase its duration, it may be applied to a suitably selected medium in which it is a pulse having an area lying between $\pi + \Delta$ and $2\pi$, and a duration less than the relaxation time. After a suitable distance through the medium, it will have been changed to a different shape in the manner shown in FIG. 3B. Furthermore, the exact desired pulse shape can be obtained by operating the material in resonance for a predetermined period of time and then applying a resonance shifting field to the medium so that it becomes transparent and permits the pulse as it exists in its then modified form to appear at the output of the material.

Referring to the graph shown in FIG. 3C wherein a $2.9\pi$ pulse is applied to the medium, it is shown that this pulse will propagate and become a $2\pi$ pulse. In so doing, the pulse intensity will increase so that its peak power will also increase. Simultaneously duration of the pulse will decrease. As a consequence, the pulse may be changed to provide greater peak powers and shorter durations. As mentioned above, the amount of the change may be controlled by operating with a medium capable of being driven off resonance so as to become transparent to the pulse at any time whereat the pulse has the desired shape.

The above effects can be utilized as a collimating or focusing device in the following manner. Assume that the initial light pulse is focused into a converging beam as it enters the resonant medium. In this case, the area of the pulse will tend to increase as it proceeds into the medium. But, a relationship exists between the nature of the focusing and the corresponding change in pulse power. This follows from the fact that the input pulse tends to maintain an area $$K \int_{-\infty}^{+\infty} E \, dt = 2\pi$$

even though the intensity tends to change due to focusing. For the $2\pi$ pulse to be maintained where the light pulse was originally converging, the resonant medium will cause the light pulse to diverge. The converse argument shows that diverging light pulses will be focused or converged. Accordingly, the medium will serve to collimate converging or diverging light pulses.

MICROWAVE APPLICATIONS

A little consideration will show that the systems and apparatus disclosed herein can be realized with electromagnetic traveling waves interacting with resonant media operating in the microwave region. Thus, there is a strict analogy between microwaves in guided structures such as waveguides and the formula is developed in analyzing light waves. Consider microwave transmission in a waveguide assumed to be lossless and empty. The fields are given by the $\bar{H}(x,y,z,t) = \bar{H}(x,y) \cos(wt - kz) h_o(z,t)$ where $\bar{H}$ describes the mode in which the guide is operating and $k = \omega/V_{\omega g}$, $\omega$ being the frequency and $V_{\omega g}$ is the phase velocity. It is also assumed that $\omega$ is not near a cut-off frequency (i.e., $V_{\omega g}$ is roughly constant with respect to $\omega$. Considering only the forward traveling wave, $h_o(z,t)$ which is modified from its constant value in the empty lossless guide to obey the equation $$(\delta h_o/\delta z) + (1/V \omega g)(\delta h_o/\delta t) = -m$$

where $m(z,t)$ $$\cong \int \bar{M} \cdot \bar{H}(x, y) \, dx \, dy.$$

M is a pseudomagnetic (or electric) moment which radiates to change $h_o$. The equations describing $m$ are the Bloch equations. If a sample is situated so that $\bar{H}(x,y)$ is almost constant over the sample, these equations will involve only the absolute value of $H(x_o,y_o)$ together with a coupling constant describing the samples interaction with the magnetic field. Under these conditions the equations found will conform to those previously described with respect to light, with appropriate definitions.

Figure 17:
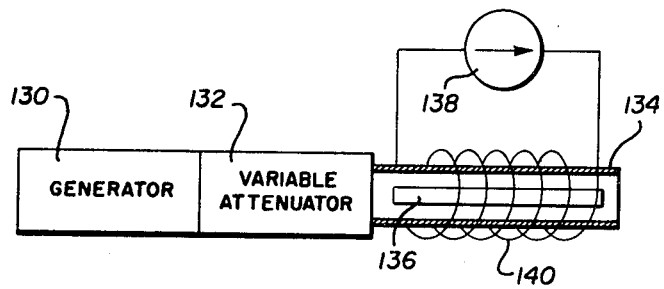
FIG. 17 is a diagrammatic view of a modified embodiment of a delay line structure for use in microwave region, constructed according to the invention.

To be more specific, the following example is given with respect to a microwave delay line utilizing the principles of the invention. Referring to FIG. 17 there is shown a generator 130 of coherent microwave energy which directs the same through variable attenuator 132. The output of the attenuator passes through a microwave waveguide section 134 which contains a resonant medium 136 having a relatively small cross section and located in a region of substantially uniform magnetic field. As the microwave energy propagates through the waveguide, it will be delayed due to the action of the resonant medium depending upon the amount of attenuation introduced by the variable attenuator. If desired, the medium can be magnetically biased with a current source 138 and coil 140 in order to broaden the line width of the response. In many cases, medium 136 can also be constructed of ruby.

The apparatus of FIG. 17 permits the invention to be carried out in the microwave spectrum.

FREQUENCY FILTERING AND MODULATION

Figure 18A:
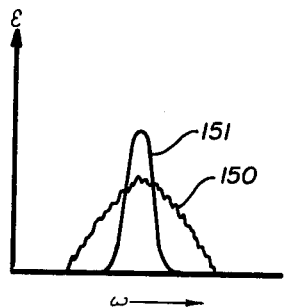
FIGS. 18A and 18B are graphs depicting the operation of the invention in filtering coherent traveling waves.
Figure 18B:
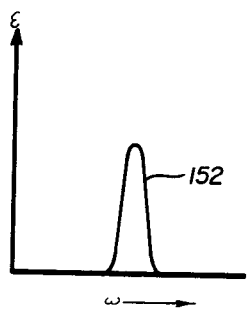

In addition to the above the invention is also applicable as filtering and frequency modulation device. Referring to FIG. 18A shows a graph of the spectrum 150a of the input frequency applied to a resonant medium in the manner of the invention as for example in the arrangement of FIG. 6. Spectrum 150a contains noise components as well as a range of frequency about the resonance 151a. It is found that the resonant medium eliminates those frequency components within the pulse which are significantly off of the resonance of the medium and which may include a large component of noise. The spectrum 152a of the output pulse is shown in FIG. 18B and has a narrower frequency content without the noise.

Figure 19:
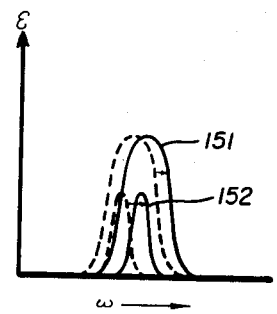
FIG. 19 is a graph depicting the operation of the invention in frequency shifts coherent traveling waves.

Referring to the graph of FIG. 19, when utilizing a suitable means for shifting the resonance line 151b to 151c in the resonant medium such as by magnetically biasing the same as in the apparatus of FIG. 12, the frequency content of the output pulse 152b tends to shift 152c with the resonance 151c so that frequency modulation of the output is achieved.

THRESHOLD SIGNAL DETECTOR

The frequency filtering property and pulse reshaping property is of direct applicability to low signal microwave radar detection. Background clutter noise or jamming noise can be eliminated by preamplification of the radar return pulses and injecting them into a microwave resonant medium tuned to the radar frequency. For pulse areas exceeding $\pi$, heretofore described, the noise will be eliminated at the output of the medium.

For weak communication and radar signals containing low coherent power, comparable to noise, a threshold signal detector is operated as follows:

Let an internally generated microwave pulse of area $\pi - \Delta$, slightly less than $\pi$, be injected into a resonant medium at the receiving station. Let $\Delta$ be very small, so that if any radiation pulse received externally, to be detected, exceeds the area $\Delta$, it will then add to the internally generated pulse area coherently to permit the traveling wave transparency condition (area $> \pi$) to take over. The appearance of the output $2\pi$ pulse at the output of the resonant medium specifies the "trigger threshold detection" of the very weak input signal. Moreover, the internally generated pulse may be used to add to weak incoming continuous wave signals, as well as pulse signals, and the onset of the transparency condition again signifies detection of the weak input signal.

The above signal detection scheme, of course, can be applied with the same logic to the detection of weak coherent light signals, pulsed or continuous wave. Apparatus for carrying out the above operations would be similar to that shown in FIG. 16, one signal path 122 being from the source to the medium 125, on which the $\pi - \Delta$ pulse would travel, the other path 124 being modified to include the low level signal pulse being sought.

PROPERTIES OF MATERIALS

Figure 20:
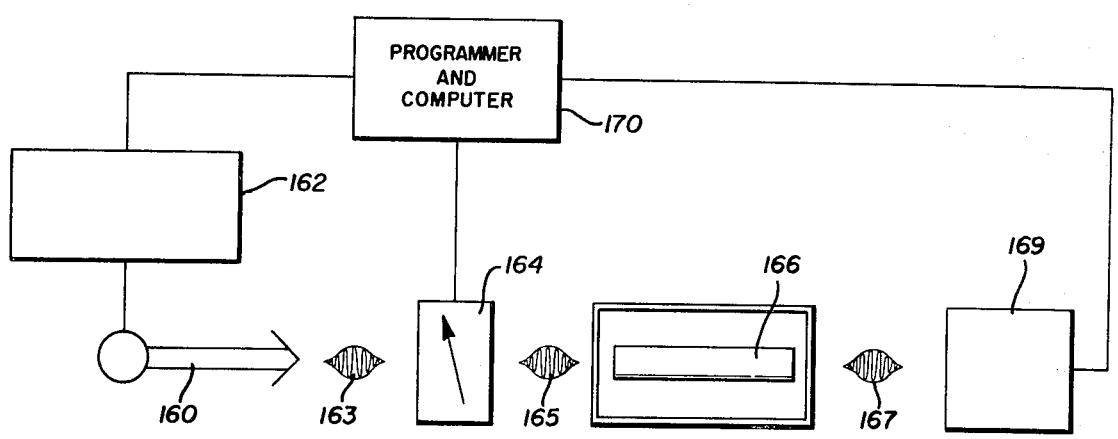
FIG. 20 is a schematic drawing of apparatus for carrying out studies on the properties of materials.

The present invention has immediate application to the investigation of the properties of materials especially solids which have theretofore been impossible to directly investigate because of resonant abosrption. Referring to FIG. 20 there is shown apparatus for carrying out such investigations with laser light and consists of a laser 160 and power source 162, the output pulse 163 of laser 160 is passed through a modifier 164 which serves to vary the frequency content, pulse width, intensity, polarization, focusing, shape or other property of the output of the laser. The modified pulse 165 is passed through the sample medium 166 understudy and the output pulse 167 from medium 166 is applied to a detector 168. The Detector 168 supplies an electrical signal 169 indicative of the envelope of the received signal which can be coordinated with the input signal via suitable programmer and computer 170 which operates to control and coordinate the entire apparatus. Unit 170 controls the modifier 164 and the laser power source 162 and correlates the pulses received from the detector with the input laser pulsing source to thereby correlate the analysis of the medium 166 under study. The following operations can be carried out utilizing the apparatus and arrangement of FIG. 20.

Means 169 is provided for changing the temperature, pressure, or other thermodynamic properties of the material being investigated. Means 169 can also be used for applying electrical or magnetic fields in order to carry out analysis of the physical changes induced thereby in the material. A suitable means can be provided for changing the dipole moment of the sample material which can find importance in analyzing a variety of gases such as the metastable states in mercury vapor and in solids such as CR + 3 in magnesium oxide.

MEASUREMENT OF THE WIDTH OF THE RESONANCE LINE OF A OPAQUE MATERIAL

Assume that a crystal satisfying the conditions set forth above which is normally opaque and has a resonance line which it is desired to investigate. Referring again to the graph shown in FIG. 4, when the input pulse bandwidth is considerably less than the resonance bandwidth of the material under investigation. In this situation, the output appears as a single $2\pi$ pulse as previously discussed. As the bandwidth of the input pulse is increased considerable changes begin to take place as it approaches the bandwidth of the resonance line. Taking for example a limiting case, as shown in FIG. 5, wherein the bandwidth of the input pulse is broader than the resonance line, the output will consist of a series of pulses lying in an envelope which is decreasing. The series of output pulses resembles damped ringing phenomenon. The resonance bandwidth of a medium under investigation can thus be directly measured by noting the onset of perturbations in the output and the development ringing as the input bandwidth approaches and exceeds the resonance line bandwidth.

MEASUREMENTS OF DOPING UNIFORMITY IN THE SEMICONDUCTORS

In the manufacture of semiconductor devices, it is often desired to uniformly dope a volume of the semiconductor with an impurity so as to change its conductivity properties. Often such impurities fail to become uniformly disbursed but rather settle into cracks or imperfections in the crystal. These effects can be exceedingly small and not directly observable. Such a concentration of dopant impurities results in inhomogeneous broadening of the resonance line of the material as contrasted to the homogeneous broadening which results from the uniform dispersion. In the homogeneous case, true relaxation exists so that the duration of an input pulse which proceeds unattenuated through the sample would have to be made considerably shorter than the inhomogeneous case. In practice, it is possible to develop a reference relaxation time associated with inhomogeneous broadening which time is significantly shorter than that associated with the homogeneous case. Accordingly, samples of normally resonantly opaque semiconductive material can be investigated in apparatus of FIG. 20 by using them as the medium and varying the duration of the input pulses. In this way the relaxation time will be determined when the duration of the input pulse becomes comparable to the damping time of the sample medium under investigation. This serves as a measure of the degree of perfection in the distribution of the impurity dopants.

SEPARATION AND MEASUREMENT OF SUPERIMPOSED OR OVERLAPPING RESONANCE LINES

In many materials there exist adjacent resonances which may overlap or lie within each other, that is to say, be superimposed. In this situation it is extremely difficult to detect and measure the characteristics of one type of resonance separately from the other. The present invention is able to separate these resonance lines under many conditions of which the following are examples.

Assume the existence of a crystal with two dopant impurities, one of which promotes a broad resonance and the other a narrow resonance which more or less coincide or overlap. It will be recalled that the $d\theta/dz$ coefficient $\theta$ is defined by the dipole moment of the particular resonance. Consequently, what is a $2\pi$ pulse for one resonance is in most instances not of the same magnitude as the $2\pi$ pulse for the other resonance. Accordingly, the resonance can be separated by sweeping the frequency across the broad resonance and measuring the area of the pulse passing through the resonance material. If the adjustment is made such that the area of the pulse is $2\pi$ for the broader resonance, this pulse will be insufficient when part of its area contributes to exciting the narrower resonance. At this point the pulse will no longer satisfy the $2\pi$ condition so that various changes will take place. Possibly there may be area to excite both resonances in which case a pair of $2\pi$ pulses will be formed probably having different kinds of delays and durations. Another possibility is that enough of the pulse would be taken into the second resonance that the $\pi + \Delta$ condition for the area of the pulse would not be satisfied for either of the resonances. In the latter case, the strong attenuation would take place.

The above scheme is directly applicable in the study of semiconductor materials. Often there is band absorption by energy levels which are quite closely situated. Where the energy levels are due to splitting in the ground state, the situation is the same as that posed by the use of two different dopant impurities having closely spaced ground states, as set forth above.

If the dopant impurities or the medium in general present more than two quantum levels for each ground state to the incoming wave, some transitions may be close to exact resonance, while simultaneously other transitions are farther off resonance. The net effect upon the incoming pulse of a specific frequency will be to parcel its energy (among all the quantum states) into a superposition of absorption and emission cycles which will impose a final characteristic of pulse shaping and attenuation on the output pulse. The final effects on the pulse will characterize the specific character of the absorbers and the crystal symmetry of the host medium. In certain situations the final output will consist of a plurality of pulses at separate carrier frequencies corresponding to the separate quantum transitions of the absorbing atoms.

In summary, the output for a given frequency sweep across the resonances would result in two cases, one in which the output would consist of two different pulses at two different frequencies and at different delays. In the other case the output would be of a single frequency and attenuated. In the latter the analysis of the pulse would provide information about the resonances since on the low frequency side the area of the $2\pi$ pulse defined by the resonance would be different in most cases from that defining the area of the $2\pi$ pulse for the other resonance. For example, in the ruby resonances referred to in the medium of FIG. 7, the areas of these resonances differ by a factor of about 50 percent.

To those skilled in the art to which this invention relates many other changes, modifications and applications of the invention will suggest themselves. For example, many other properties of materials can be investigated by using the invention. By way of example, there exist crystalline solids which are normally opaque, and which possess birefringence which can be studied by using polarized light pulses as described herein. Accordingly, the description and disclosures contained herein are to be taken as illustrative of the invention and not as a limitation thereon.

We claim:

1. In a method for propagating periodically varying electromagnetic waves through a medium exhibiting a resonance response to such waves and therefore normally opaque to such waves, the steps of forming a coherent pulse of said electromagnetic waves, said pulse being composed of waves having a frequency content capable of coupling to said resonance response, limiting the product of the strength of said pulse and its duration in accordance with the equation $$K \int_{-\infty}^{+\infty} E dt > \pi$$

where $\pi = 3.1416...$, $E$ is the electric field strength of said waves, and t is the duration of said pulse to a value less than the relaxation time of the response of said medium, and applying one or more of said pulses to said medium.

2. In apparatus for propagating periodically varying electromagnetic waves through a medium exhibiting a resonance response to such waves and therefore normally opaque to such waves, means for generating a coherent pulse of electromagnetic energy composed of waves having a frequency content capable of coupling to said resonance response, means for causing the output of said generator to occur in pulse-like bursts having the property that the product of the strength of said pulse-like bursts and its duration is limited in accordance with the equation $$K \int_{-\infty}^{+\infty} E dt > \pi$$

where $\pi = 3.1416...$, $E$ is the electric field strength of said waves, and t is the duration of said pulse-like burst, in which said pulse is further characterized by having a duration less than the relaxation time of the response of said medium.

3. Apparatus as in claim 2 in which said generator is a ruby laser and in which said medium is a ruby rod normally absorptively resonant to the output of said laser.

4. Apparatus as in claim 2 further including a receiver responsive to said electromagnetic waves and means for mounting said receiver in an aligned position with respect to said means for generating electromagnetic energy for receiving said electromagnetic waves at a location spaced apart therefrom.

5. In apparatus for delaying electromagnetic waves, means for generating coherent electromagnetic waves, a medium exhibiting a resonance to such waves but transmissive to bursts of said electromagnetic waves whenever the product of the strength of a pulse thereof and its duration is limited in accordance with the equation $$K \int_{-\infty}^{+\infty} E dt > \pi$$

when $\pi = 3.1416...$, E is the electric field strength of said wave, and t is the duration of said pulse, and wherein the duration of said pulse is limited to a value less than the relaxation time of the response of said medium, means mounting said generator so that said pulse is passed through a predetermined length of said medium.

6. Apparatus as in claim 5 further including means for varying the delay of said waves through said medium.

7. Apparatus as in claim 6 in which said means for varying the delay includes means for broadening the resonance and bandwidth of said medium.

8. Apparatus as in claim 7 in which said means for broadening the resonance bandwidth includes means for magnetically biasing said medium.

9. Apparatus as in claim 6 wherein said means for varying the delay includes means for shortening the duration and increasing the strength of said pulses.

10. Apparatus as in claim 6 wherein said means for varying the delay includes means for changing the pulse cross section.

11. Apparatus as in claim 10 wherein said means for generating coherent electromagnetic waves comprises of a laser having an output beam and in which said means for changing said pulse cross section includes a lens having a variable focal length for varying the divergence of said laser beam whereby the delay increases as the power density is decreased by said lens.

12. Apparatus as in claim 5 further including means for defining a plurality of channels through said medium, means for recycling a pulse through said plurality of channels, and means for extracting pulses from said channels.

13. Apparatus as in claim 12 further including means for selectively shifting the resonance line shape of at lease one of the channels of said medium.

14. In apparatus for performing a logic operation, a coherent electromagnetic wave generator, a medium normally absorptively resonant to electromagnetic waves of a predetermined frequency generated by said generator but transmissive bursts of coherent electromagnetic waves wherein the product of the strength of a pulse of said waves and its duration is limited in accordance with the equation $$K \int_{-\infty}^{+\infty} E dt > \pi$$

where $\pi = 3.1416...$, E is the electric field strength of said wave, and t is the duration of said pulse, and further limited such that the duration of said pulse is less than the relaxation time of the response of said medium, means forming two signal paths between said generator and said medium, said signal paths having outputs directed toward an input of said medium so that the outputs of said signal paths cooperate thereat to produce a pulse within the medium which is the sum of the signals traversing said paths, means controlling the level of the signals within said paths so that the pulse area thereof is less than $\pi$ so that, whenever both signals are present, a combined signal is produced having a strength greater than $\pi$ which then propagates through the medium, and whenever either of said input signals is present alone it is attenuated by the resonant medium and no output pulse is emitted.

15. In pulse shaping apparatus for modifying electromagnetic waves, means for generating bursts of coherent electromagnetic waves, a medium normally absorptively resonant to electromagnetic waves of a predetermined frequency generated by said last named means but transmissive to bursts thereof characterized by the product of the strength of said burst in its duration being limited in accordance with the equation $$K \int_{-\infty}^{+\infty} E dt > \pi$$

where $\pi = 3.1416...$, E is the electric field strength of said wave, and t is the duration of said pulse, and further in which the burst is limited to a duration less than the relaxation time of the response of said medium, means mounting said generator so that said pulses pass through a predetermined length of said medium, pulses having an area lying between $\pi$ and $2\pi$ being increased in duration and decreased in intensity as they are passed through the medium while pulses having an area lying between $2\pi$ and $3\pi$ being increased in intensity and shortened in duration.

16. Apparatus as in claim 15 further including means for shifting the resonance of the medium so that it becomes transparent to permit the pulse as $\pi$ to exist in its modified form in a particular time to appear at the output of the device.

17. In apparatus for changing the convergence and divergence of electromagnetic waves, means for generating bursts of electromagnetic waves having a predetermined frequency and including means for limiting the product of the strength of said burst in its duration in accordance with the equation $$K \int_{-\infty}^{+\infty} E dt > \pi$$

where $\pi = 3.1416$, E is the electric field strength of said wave, and t is the duration of said pulse, a medium normally resonant to said traveling electromagnetic waves said means for generating said coherent electromagnetic waves further including means for limiting the duration of said pulse to a value less than the relaxation time of the response of said medium and for applying said bursts to said medium so that said waves propagate through the medium, whereby diverging or converging electromagnetic energy within said bursts are collimated by said medium.

18. In a method for detecting low level electromagnetic signals the steps of providing a medium exhibiting resonance response to electromagnetic energy of a predetermined frequency and therefore normally opaque to such electromagnetic waves, forming coherent pulses of electromagnetic waves of said predetermined frequency, limiting the product of the strength of said pulse and its duration to a value in accordance with the equation $$K \int_{-\infty}^{+\infty} E dt > \pi$$

to slightly less than $\pi$ where $\pi = 3.1416...$, E is the electric field strength of the applied pulse, and t is the duration of said pulse and further limiting said pulse to a value less than the relaxation time of the response of said medium, applying said pulses to said medium, further applying the low level to be detected to said medium so that said pulse and said low level signal combine to create a pulse within the medium in which the combined pulse satisfies the criteria $$K \int_{-\infty}^{+\infty} E dt > \pi$$

(where E includes both pulse and signal components) whereby the absence of said low level signal is indicated by the absence of an output pulse from the medium and the presence of said low level signal being sufficient to induce said medium to propagate the combined signal so that the presence of an output pulse from the medium is indicative of the existence of a low level signal applied to the input.

19. A method as in claim 18 wherein said signals are microwave signals.

20. Apparatus for investigating the properties of materials comprising a generator for providing an output of coherent electromagnetic waves said generator including means for varying the pulse duration and intensity of the output of said waves as over a range including wherein bursts are formed characterized by a predetermined frequency content and having the property that the product of the strength of said burst and its duration is limited in accordance with the equation $$K\int_{-\infty}^{+\infty} Edt > \pi$$

where $\pi=3.1416$, $E$ is the electric field strength of said waves and $t$ is the duration of said bursts and further including means for limiting the duration of said bursts to a value less than a predetermined time of an exptected value corresponding to the relaxation time of the material to be investigated so that the bursts are applied thereto, means for detecting the amount remaining of said bursts which have passed through the material.

21. Apparatus as in claim 20 further including a programmer and computer for controlling and coordinating the apparatus to record the variation in intensity and pulse duration of bursts applied to the sample medium under investigation as a function of the output response from the sample medium.

22. Apparatus as in claim 20 further including means for sweeping the frequency of the output bursts across a predetermined bandwidth of frequencies.

23. Apparatus as in claim 20 further including means for varying a thermodynamic variable of the material under investigation so that the changes of the transmission properties of the material can be measured and correlated with the changes in the material due to varying thermodynamic variables.

24. A method for measuring the bandwidth of a resonance exhibited by a material, said resonance relating to a response to electromagnetic waves so that said material is normally opaque thereto, the steps of forming and applying to said material coherent pulses of said electromagnetic waves each pulse being composed of waves having a frequency content capable of coupling to said resonance response, limiting the product of the strength of said pulse and the duration thereof in accordance with the equation $$K\int_{-\infty}^{+\infty} Edt > \pi$$

where $\pi=3.1416$, $E$ is the electric field strength of said waves, and $t$ is the duration of said pulse, further limiting the duration of said pulse to a value less than the relaxation time of the response of said medium, subsequently increasing the frequency bandwidth of the input pulses to said material and noting the onset perturbations in the waves transmitted by said medium as the input bandwidth approaches the resonance bandwidth.

25. A method for measuring the uniformity of doping of a volume of semiconductor having an impurity therein comprising the steps of measuring the relaxation time of a uniformly doped reference semiconductor sample by applying a coherent traveling electromagnetic wave pulse to said semiconductor sample said pulse being further composed of waves having a frequency count capable of coupling to the resonance of said sample and limiting the product of the strength of said pulse in its duration in accordance with the equation $$K\int_{-\infty}^{+\infty} Edt > \pi$$

where $\pi=3.1416$, $E$ is the electric field strength of said waves, and $t$ is the duration of said pulse, and further limiting the duration of said pulse to a value less than the relaxation time of the response of said uniformly doped semiconductor, thereafter increasing the duration of said pulse until it is attenuated due to the homogeneous doping of said semiconductor to thereby define a reference relaxation time, applying coherent electromagnetic pulses of energy to successive samples of semiconductor material in which said pulses are also characterized by the equation $$K\int_{-\infty}^{+\infty} Edt > \pi$$

and a duration slightly less than said reference time, and noting those samples under test which absorbed an input pulse such absorption being indicative of inhomogeneous broadening due to imperfect distribution of the dopants within said sample.

26. In a method for varying the shape of an electromagnetic wave the steps of passing said wave through a medium exhibiting a resonance to such waves, forming a coherent pulse of said waves having a frequency content capable of coupling to said resonance response of said medium, limiting the product of the strength of the pulse and its duration in accordance with the equation $$K\int_{-\infty}^{+\infty} Edt > \pi$$

where $\pi=3.1614$, $E$ is the electric field strength of said waves and $t$ is the duration of said pulse limiting the duration of said pulse to a value less than the relaxation time of the response of said medium and applying said pulses to said medium, said medium serving to reform said input pulses into output pulses satisfying the equation $$K\int_{-\infty}^{+\infty} Edt = 2\pi$$

27. In a method for propagating periodically varying electromagnetic or sound waves through a medium exhibiting a resonance response to such waves and therefore normally opaque to such waves, the steps of forming a coherent pulse of said waves, said pulse being composed of waves having a frequency content capable of coupling to said resonance response, limiting the production of the strength of said pulse and its duration in accordance with the equation $$K\int_{-\infty}^{+\infty} Edt > \pi$$

where $\pi = 3.1416...$, $E$ is the field strength of said waves, and $t$ is the duration of said pulse to a value less than the relaxation time of the response of said medium, and applying one or more of said pulses to said medium.

28. In an apparatus for propagating periodically varying electromagnetic or sound waves through a medium exhibiting a resonance response to said waves and therefore normally opaque to such waves, means for generating a coherent pulse of said waves having a frequency content capable of coupling to said resonance response, means for causing the output of said generator to occur in pulse-like bursts having the property that the production of the strength of said pulse-like bursts and its duration is limited in accordance with the equation $$K\int_{-\infty}^{+\infty} Edt > \pi$$

where $\pi = 3.1416...$, $E$ is the field strength of said waves, and $t$ is the duration of said pulse-like burst, and in which said pulse is further characterized by having a duration less than the relaxation time of the response of said medium.

* * * * *